US 11,082,826 B2

(12) United States Patent
Yun (10) Patent No.: US 11,082,826 B2
(45) Date of Patent: Aug. 3, 2021

(54) EMERGENCY COMMUNICATION METHOD AND APPARATUS (71) Applicant: BAICELLS TECHNOLOGIES CO. LTD., Beijing (CN)

(72) Inventor: Xiang Yun, Beijing (CN)

(73) Assignee: BAICELLS TECHNOLOGIES CO. LTD., Beijing (CN)

(*) Notice: Subject to any disclaimer, the term of this patent is extended or adjusted under 35 U.S.C. 154(b) by 182 days.

(21) Appl. No.: 16/034,434

(22) Filed: Jul. 13, 2018

(65) Prior Publication Data

US 2019/0045344 A1 Feb. 7, 2019

Related U.S. Application Data (63) Continuation of application No. PCT/CN2017/071063, filed on Jan. 13, 2017.

(30) Foreign Application Priority Data

Jan. 15, 2016 (CN) .......................... 201610027873.0

(51) Int. Cl.
*H04W 4/90* (2018.01)
*H04W 4/029* (2018.01)
(Continued)

(52) U.S. Cl.
CPC ............. *H04W 4/90* (2018.02); *H04W 4/029* (2018.02); *H04W 4/16* (2013.01); *H04W 76/50* (2018.02)

(58) Field of Classification Search
CPC ....... H04W 4/029; H04W 4/90; H04W 76/50; H04W 4/023; H04W 4/16; H04W 68/005; H04W 88/04
See application file for complete search history.

(56) References Cited

U.S. PATENT DOCUMENTS

2010/0009665 A1   1/2010  Hawkins et al.
2013/0012175 A1*  1/2013  Butterfield ........ H04M 3/42382
                                                    455/414.1
(Continued)

FOREIGN PATENT DOCUMENTS

CN   1520132 A    8/2004
CN   103141071 A  6/2013
CN   105682065 A  6/2016

OTHER PUBLICATIONS

International Search Report for International Application No. PCT/CN2017/071063, dated Mar. 10, 2017.
(Continued)

*Primary Examiner* — Margaret G Mastrodonato
(74) *Attorney, Agent, or Firm* — Marshall, Gerstein & Borun LLP (57) ABSTRACT The present disclosure relates to an emergency communication method and device. The emergency communication method includes: receiving an emergency communication request issued from a calling device to a called device; searching for communication devices within a set range of the called device; selecting, from the communication devices found in the searching, communication devices having an emergency communication auxiliary function which is in an on state as auxiliary devices; and establishing a communication connection between the calling device and the auxiliary devices, so that a user of the calling device communicates with a user of the called device through the auxiliary devices. The present disclosure can realize emergency communication in real time, which is convenient and fast, and ensures the timely establishment of emergency communication.

8 Claims, 6 Drawing Sheets (51) Int. Cl.
*H04W 76/50* (2018.01)
*H04W 4/16* (2009.01)

(56) References Cited

U.S. PATENT DOCUMENTS

| 2014/0065997 | A1* | 3/2014 | Walker | H04W 4/90 |
| | | | | 455/404.1 |
| 2014/0335814 | A1* | 11/2014 | Gudlavenkatasiva | H04W 4/90 |
| | | | | 455/404.1 |
| 2017/0153694 | A1* | 6/2017 | Baldwin | G06F 1/3212 |
| 2017/0164332 | A1* | 6/2017 | Kim | H04W 76/10 |

OTHER PUBLICATIONS

Written Opinion of International Application No. PCT/CN2017/071063, filed Mar. 10, 2017.
First Office Action issued by The State Intellectual Property Office of People's Republic of China for Application No. CN201610027873.0, dated Jun. 5, 2018.

* cited by examiner

EMERGENCY COMMUNICATION METHOD AND APPARATUS

CROSS-REFERENCE TO RELATED APPLICATIONS

The present application is based on International Patent Application No. PCT/CN2017/071063, filed Jan. 13, 2017, which claims priority to Chinese Patent Application No. 201610027873.0, filed on Jan. 15, 2016, the contents of each of which are incorporated herein by reference in the entirety.

TECHNICAL FIELD

The present disclosure relates to the field of communications, and in particular, to an emergency communication method and device.

BACKGROUND

Figure 1:
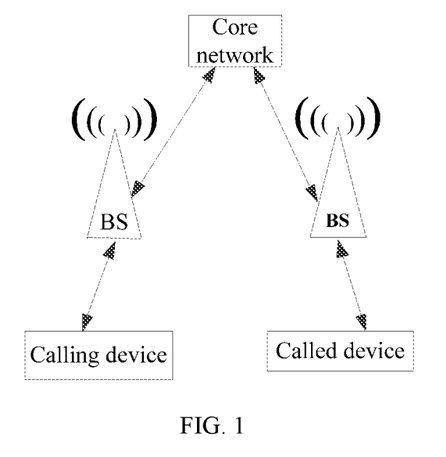
FIG. 1 is a schematic diagram of a communication link of a mobile communication system.

A mobile communication system is a system that provides communication services for mobile terminals such as mobile phones. In a mobile communication system, a calling device and a called device are connected to a core network through a base station (BS) as an access device to obtain a communication service. FIG. 1 is a schematic diagram of a communication link of a mobile communication system. Referring to FIG. 1, the establishment process of the communication link of the mobile communication system is as follows: the calling device sends a communication request to a serving base station of the calling device, the serving base station of the calling device forwards the communication request to the core network, the core network then forwards the communication request to a serving base station of the called device, and then the serving base station of the called device forwards the communication request to the called device. The response of the called device to the communication request is transmitted to the calling device through the serving base station of the called device, the core network and the serving base station of the calling device successively, thereby establishing a communication connection between the calling device and the called device.

Figure 2:
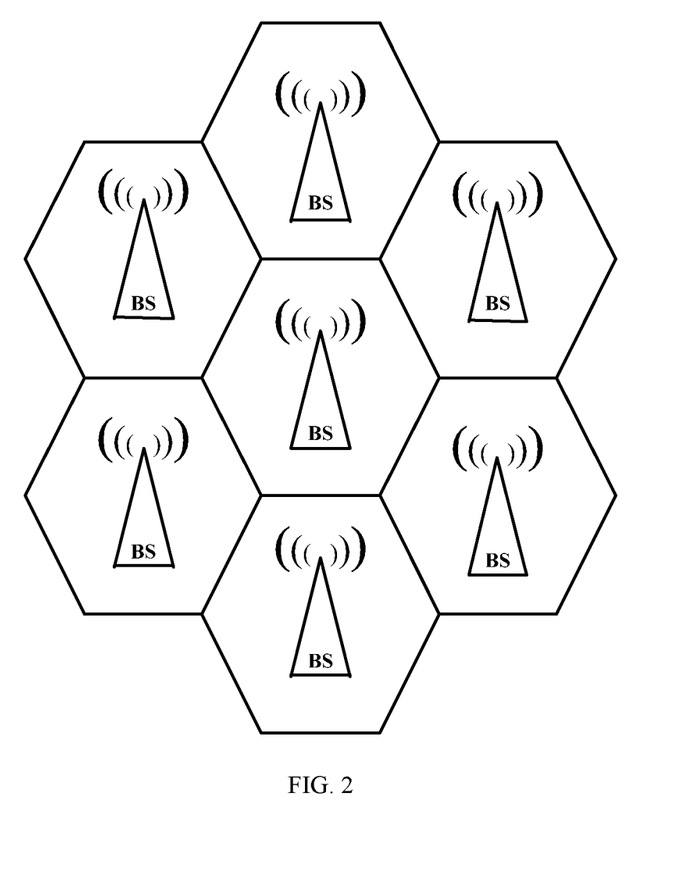
FIG. 2 is a schematic diagram of a base station and a cellular network.

The base station is an access device in the mobile communication system and is responsible for connecting a user equipment to the core network. The operator deploys multiple base stations in the mobile communication system. Each base station covers a certain spatial range. The coverage range of the base station is called a cell or a sector. When the user equipment enters the coverage range of a certain base station, the base station performs an access service for the user equipment. Each base station divides the coverage area of the mobile communication system into a network like a honeycomb, called a cellular network, which is the coverage principle of the mobile communication system. FIG. 2 is a schematic diagram of a base station and a cellular network. In FIG. 2, a triangle indicates a base station, and a hexagon indicates a coverage range of a base station therein.

In the actual communication process, due to the poor signal quality of the called user and the shutdown of the mobile phone, usually the communication link cannot be established. This creates an obstacle to user communication in an emergency. In order to meet the communication needs in an emergency situation, the related technology adopts a call forwarding technology to transfer a call of a calling device to a called device to another standby device of the called user. The called device and the standby device are two different communication numbers. In the related art, the called user needs to have both the called device and the standby device at the same time, which is inconvenient to carry. Moreover, if the standby device is damaged or the signal quality is not good, the called user's emergency communication link is not guaranteed.

SUMMARY

An object of the present disclosure is to provide an emergency communication method and device capable of establishing emergency communication conveniently, quickly and in a timely manner.

To achieve the above object, the present disclosure proposes an emergency communication method, including: receiving an emergency communication request issued from a calling device for a called device; searching for communication devices within a set range of the called device; selecting, from communication devices found in the searching, a communication device having an emergency communication auxiliary function which is in an on state as auxiliary devices; and establishing a communication connection between the calling device and the auxiliary device, so that a user of the calling device communicates with a user of the called device through the auxiliary device.

Furthermore, the above method may also have the following features. The method further includes, prior to searching for communication devices within a set range of the called device: determining a first correlation value between the calling device and the called device, and allowing emergency communication between the calling device and the called device when the first correlation value is greater than a first preset correlation threshold.

Furthermore, the above method may also have the following features. The method further includes, prior to establishing a communication connection between the calling device and the auxiliary devices: determining a second correlation value between the auxiliary devices and the called device, and allowing the auxiliary devices to assist the called device in emergency communication when the second correlation value is greater than a second preset correlation threshold.

Furthermore, the above method may also have the following features. The set range is smaller than a coverage range of a base station the called device is currently accessing, and the set range is a circular area range with a first set radius centered at a current location of the called device, or the set range is a circular area range with a second set radius centered at a predicted location of the called device.

Furthermore, the above method may also have the following features. Establishing the communication connection between the calling device and the auxiliary device, so that the user of the calling device communicates with the user of the called device through the auxiliary device includes: attempting to establish a communication connection between the calling device and each of auxiliary devices in a descending order of priorities of the auxiliary devices until a communication connection is successfully established between one of the auxiliary devices and the calling device.

The emergency communication method in the embodiment of the present invention realizes emergency communication between a calling device and a called device by using other communication devices in the vicinity of the called device, does not require the called user to carry any standby devices, and can realize emergency communication in real time, which is convenient and quick and ensures the timely establishment of emergency communications.

In order to achieve the above object, the present disclosure also proposes an emergency communication device, including: a receiving module, a searching module, a selecting module and a connecting module connected successively, wherein the receiving module is configured to receive an emergency communication request issued from a calling device for a called device; the searching module is configured to search for communication devices within a set range of the called device; the selecting module is configured to select, from the communication devices found in the searching by the searching module, communication devices having an emergency communication auxiliary function which is in an on state as auxiliary devices; and the connecting module is configured to establish a communication connection between the calling device and the auxiliary devices, so that a user of the calling device communicates with a user of the called device through the auxiliary devices.

Furthermore, the above device may also have the following features. The device further includes a first determining module, wherein the first determining module is connected to respectively the receiving module and the searching module, and is configured to determine a first correlation value between the calling device and the called device, and when the first correlation value is greater than a first preset correlation threshold, activate the searching module to allow emergency communication between the calling device and the called device.

Furthermore, the above device may also have the following features. The device further includes a second determining module, wherein the second determining module is respectively connected to the selecting module and the connecting module, and is configured to determine a second correlation value between the auxiliary devices and the called device, and when the second correlation value is greater than a second preset correlation threshold, activate the connecting module to allow the auxiliary devices to assist the called device in emergency communication.

Furthermore, the above device may also have the following features. The set range is smaller than a coverage range of a base station the called device is currently accessing, and the set range is a circular area range with a first set radius centered at a current location of the called device, or the set range is a circular area range with a second set radius centered at a predicted location of the called device.

Furthermore, the above device may also have the following features. The connecting module includes: a first connection unit configured to attempt to establish a communication connection between the calling device and auxiliary devices in a descending order of priorities of the auxiliary devices until a communication connection is successfully established between one of the auxiliary devices and the calling device.

An embodiment of the present disclosure also provides a non-transitory computer readable storage medium storing computer instructions for causing a computer to perform the above emergency communication method in the present disclosure.

An embodiment of the present disclosure also provides a computer program product, including: a computing program stored on a non-transitory computer readable storage medium, the computer program including program instructions which, when executed by a computer, cause the computer to perform the above emergency communication method in the present disclosure.

An embodiment of the present disclosure also provides an electronic device, including: at least one processor; and a memory communicatively coupled to the at least one processor, wherein the memory stores instructions executable by the at least one processor, the instructions being configured to perform the above emergency communication method in the present disclosure.

The emergency communication device of the embodiment of the present invention realizes emergency communication between a calling device and a called device by using other communication devices in the vicinity of the called device, does not require the called user to carry any standby devices, and can realize emergency communication in real time, which is convenient and quick and ensures the timely establishment of emergency communications.

BRIEF DESCRIPTION OF DRAWINGS

In order to more clearly illustrate the technical solutions of the embodiments of the present disclosure, the drawings used in the embodiments will be briefly described below. It is obvious that the drawings in the following description are only some embodiments of the present disclosure. One of ordinary skill in the art can also obtain other drawings based on these drawings without any inventive efforts.

DESCRIPTION OF EMBODIMENTS

The principles and features of the present disclosure are described in the following with reference to the accompanying drawings, which are only used to explain the present disclosure and are not intended to limit the scope of the application. All the embodiments obtained according to the spirit of the present disclosure without any inventive efforts are within the scope of protection of the present disclosure.

Figure 3:
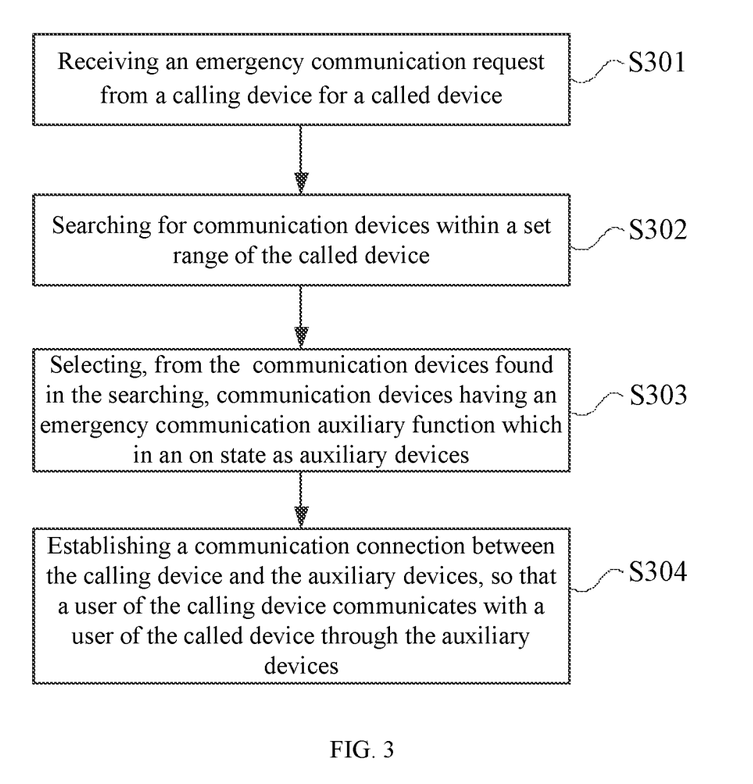
FIG. 3 is a flowchart of an emergency communication method according to embodiment 1 of the present disclosure.

FIG. 3 is a flowchart of an emergency communication method according to embodiment 1 of the present disclosure. As shown in FIG. 3, in this embodiment, the emergency communication method may include the following steps.

In step S301, an emergency communication request from a calling device for a called device is received.

It should be noted that only when the emergency communication function of the calling device is in an on state, the calling device can issue an emergency communication request, and the network side can receive the emergency communication request issued from the calling device for the called device. The emergency communication function may be an application APP in the calling device, hereinafter referred to as an emergency communication APP or an emergency communication application.

The calling device and the called device may be mobile phones.

In a specific application, an emergency communication function icon can be provided on a user interface of the calling device, and a user can turn on or off the emergency communication function by means of manual setting.

One way of receiving an emergency communication request issued from the calling device for the called device may be: receiving specific information sent by the calling device to the network, the specific information including the meaning indication of the calling device applying for emergency communication and the object (i.e. the called device) information of emergency communication.

Another way of receiving the emergency communication request issued from the calling device for the called device may be: when receiving consecutive calls of the calling device to the called device, the calling device may be considered to apply for emergency communication of the called device.

In step S302, communication devices within a set range of the called device are searched.

The set range can be set by the user, the manufacturer or the operator. For example, the set range may be smaller than a coverage range of a base station the called device is currently accessing, and may be a circular area range with a first set radius centered at a current location of the called device, or may be a circular area range with a second set radius centered at a predicted location of the called device. The first set radius and the second set radius may be set by the user, the manufacturer, or the operator.

The purpose of this step is to determine communication devices that are relatively close to the called device in order to select auxiliary devices therefrom.

When the called device and the serving base station can establish a connection but the signal is poor, the specific location of the called device and the location of the current serving base station of the called device can be obtained by means of satellite navigation positioning, base station positioning, etc., and the current serving base station may then select other communication devices in the network within a certain range of the called device as auxiliary devices.

When the called device cannot establish a connection with the serving base station, it is necessary to predict the range of activities of the called device and select the auxiliary devices. First, the network determines the serving base station that is ultimately connected to the called device, the movement trajectory of the called device before disconnection, the movement speed, and the difference between the call time and the disconnection time. Second, the base station selects users under a plurality of base stations around the ultimate serving base station of the called device as auxiliary devices. If the time difference is large or the user moves fast, the service can be turned off because the user's range of activities cannot be accurately predicted. When the time difference is small or the user moves at a small speed, communication devices under fewer base stations are selected as auxiliary devices. Preferably, when small base stations are used to build a mobile communication network, the auxiliary devices can also be selected by using the relationship between the small base stations. For example, when the called device is in the office, the connected communication devices under multiple small base stations covering the office can be selected as auxiliary devices.

In step S303, communication devices having an emergency communication auxiliary function which is in an on state are selected from the communication devices found in the searching as auxiliary devices.

In a specific application, in order to avoid the user's interruption caused by the emergency communication function and improve the user experience, an emergency communication auxiliary function icon can be provided on the user interface of the communication device, and the user can turn on or off the emergency communication auxiliary function by means of manual setting as required.

The auxiliary device may be a mobile phone, or may be a portable computer or a wearable smart device with a 3G/4G communication module.

In step S304, a communication connection between the calling device and the auxiliary devices is established, so that a user of the calling device communicates with a user of the called device through the auxiliary devices.

In the embodiment of the present disclosure, step S304 may include: attempting to establish a communication connection between the calling device and each of auxiliary devices in a descending order of priorities of the auxiliary devices until a communication connection is successfully established between one of the auxiliary devices and the calling device.

In the embodiment of the present disclosure, step S304 may include: using the auxiliary devices as relay devices, and causing the auxiliary devices to forward the communication signal of the calling device to the called device. This method is generally applied to the case where the called device user is far away from the auxiliary device user, and the far distance mainly indicates that the called device user cannot perform emergency communication in time by answering the auxiliary device. For example, it is assumed that device A, device B, and device C are a calling device, a called device, and an auxiliary device respectively. When device C is a relay device in emergency communication, device C receives a communication signal of device A, and forwards the communication signal to device B. At this time, a communication link is established between device A and device B, except that the communication link needs to be relayed by device C.

In the embodiment of the present disclosure, step S304 may further include: the user of the called device communicates with the user of the calling device by answering the auxiliary device. This method is generally applied to the case where the called device user is close to the auxiliary device user, and the close distance mainly indicates that the called device user can perform emergency communication in time by directly answering the auxiliary device. For example, it is assumed that device A, device B, and device C are a calling device, a called device, and an auxiliary device respectively. When device A establishes a communication link with device C, and a user of device B is close to device C, the user of device B directly answers device C, thereby performing emergency communication with the user of device A. In a specific application, the process of establishing a communication connection may be: a base station sends a request for establishing a communication connection to an auxiliary device, and when the auxiliary device affirms (referring to a user of the auxiliary device agreeing to assist a calling device to communicate), the calling device establishes a communication connection with the auxiliary device, and the auxiliary device passes the information to the called device. When the auxiliary device refuses, the service is terminated. The specific method of sending a communication connection request can be as follows.

A base station simultaneously sends a communication connection establishment request to a plurality of auxiliary devices, and the plurality of auxiliary devices competes for responding to the connection request.

The base station sets different priorities for the auxiliary devices according to the distance between the auxiliary devices and a called device, and sends a communication connection establishment request according to the priority from high to low.

The specific way of sending a communication connection request may be providing the information of the called device by means of a reminder of a short message, a WeChat message, a mobile terminal or an independently developed application for the auxiliary device to determine whether to confirm the connection.

The emergency communication method of the present disclosure is further explained by a specific application example. It is assumed here that device A is a calling device, device B is a called device, an emergency communication application APP is installed in device A, and an icon of the emergency communication APP is provided on an interface. The emergency communication process between device A and device B includes the following steps.

In step a, a user of device A turns on the emergency communication function by means of manual setting (the user can also keep the emergency communication function open for a long time), and after turning-on, the icon of the emergency communication APP is activated.

In step b, the user of device A clicks the icon of the emergency communication APP, device A enters the interface of the emergency communication APP, the user inputs the number of device B on the interface of the emergency communication APP, and then clicks an emergency communication touch button to issue emergency communication request information to device B, the emergency communication request information including specific information indicating that the request is an emergency communication request.

In step c, after receiving the communication request issued from device A for device B, the network side determines, according to the specific information included in the communication request, the communication request as an emergency communication request, and then starts the processing flow of the network side in terms of emergency communication.

In step d, the network side first searches for communication devices within the set range of the called device, and it is assumed that the communication devices that are searched within the set range of the called device has device C, device D, and device E.

In step e, the network side selects, from the communication devices found in the searching (device C, device D, and device E), communication devices having an emergency communication auxiliary function which is in an on state as auxiliary devices, and it is assumed that device C and device D have an emergency communication auxiliary function and the emergency communication auxiliary functions of device C and device D are both in an on state, the network side selects device C and device D as auxiliary devices.

In step f, the network side sends an auxiliary emergency communication request to device C and device D respectively according to a predetermined policy, and it is assumed that a user of device C agrees to the auxiliary emergency communication request, and a user of device D rejects the auxiliary emergency communication request.

In step g, the network side establishes a communication connection between device A and device C, so that the user of device A communicates with the user of device B through device C.

The emergency communication method in the embodiment of the present invention realizes emergency communication between a calling device and a called device by using other communication devices in the vicinity of the called device, does not require the called user to carry any standby device, and can realize emergency communication in real time, which is convenient and quick and ensures the timely establishment of emergency communications.

Figure 4:
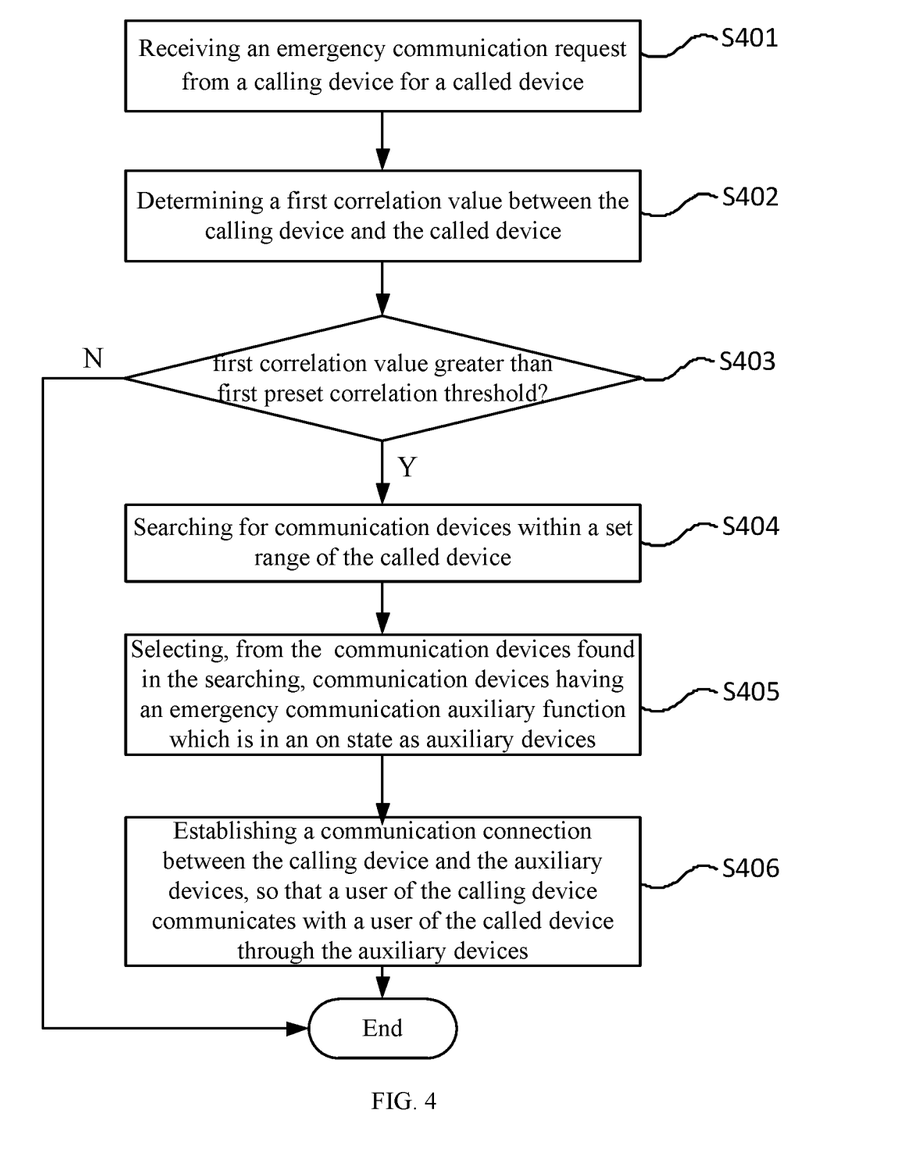
FIG. 4 is a flowchart of an emergency communication method according to embodiment 2 of the present disclosure.

FIG. 4 is a flowchart of an emergency communication method according to embodiment 2 of the present disclosure. As shown in FIG. 4, in this embodiment, the emergency communication method may include the following steps.

In step S401, an emergency communication request from a calling device for a called device is received.

In step S402, a first correlation value between the calling device and the called device is determined.

In a specific application, the first correlation value between the calling device and the called device may be determined in various manners as follows.

Method 1, User Settings

The first correlation value between the calling device and the called device is determined according to the emergency contact association set by the calling device and the called device.

Method 2, Base Station Determination

The first correlation value between the calling device and the called device is determined according to information such as the contact frequency between the calling device and the called device, the call duration, and the like.

Method 3, Third Party

For example, the first correlation value between the calling device and the called device is obtained through WeChat moments, QQ friends, and the like.

In each method, the specific calculation method of the first correlation value can be set by the user or the manufacturer. For example, in the case of the first method of user settings, it may be set that: the first correlation value is A when the calling device and the called device are each other's emergency contact, the first correlation value is B when one of the calling device and the called device is the emergency contact of the other party, and the first correlation value is C when the calling device and the called device are not the emergency contact of the other party, and A is greater than B, and B is greater than C.

In step S403, whether the first correlation value is greater than a first preset correlation threshold is determined, and if the first correlation value is greater than the first preset correlation threshold, the calling device is allowed to perform emergency communication with the called device, and step S404 will be performed, otherwise this step ends.

In step S402 and step S403, whether the calling device is allowed to perform emergency communication with the called device is determined according to the degree of correlation between the calling device and the called device, so that only the communication devices with a high correlation degree can perform emergency communication and communication devices with a low correlation degree are not allowed to perform emergency communication. This is because, in a specific application, in most cases, it is possible for people to perform emergency communicate with family members and friends with whom they contact frequently, and there is no need for emergency communication with unrelated strangers. Therefore, by step S402 and step S403, it is possible to avoid abuse of the emergency communication function between communication devices with no association or less association to save communication resources.

In step S404, communication devices within a set range of the called device are searched.

In step S405, communication devices having an emergency communication auxiliary function which is in an on state are selected from the communication devices found in the searching as auxiliary devices.

In step S406, a communication connection between the calling device and the auxiliary devices is established, so that a user of the calling device communicates with a user of the called device through the auxiliary devices, and the step ends.

The emergency communication method in the embodiment of the present invention realizes emergency communication between a calling device and a called device by using other communication devices in the vicinity of the called device, does not require the called user to carry any standby device, and can realize emergency communication in real time, which is convenient and quick and ensures the timely establishment of emergency communications. Moreover, the emergency communication method in the embodiment of the present disclosure determines whether the calling device is allowed to perform emergency communication with and the called device according to the degree of correlation between the calling device and the called device, thereby avoiding abuse of the emergency communication function between communication devices with no association or less association to save communication resources.

Figure 5:
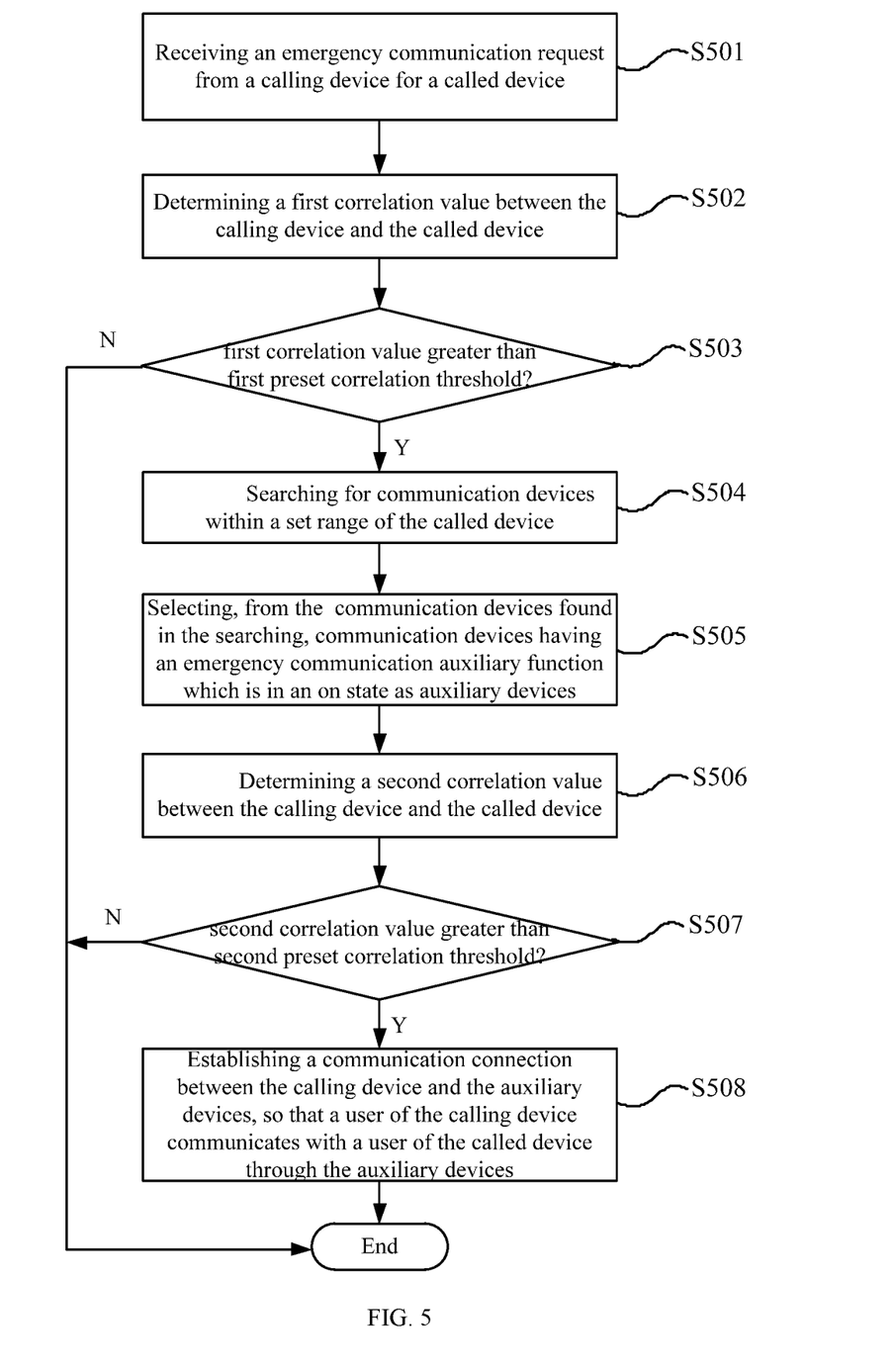
FIG. 5 is a flowchart of an emergency communication method according to embodiment 3 of the present disclosure.

FIG. 5 is a flowchart of an emergency communication method according to embodiment 3 of the present disclosure. As shown in FIG. 5, in this embodiment, the emergency communication method may include the following steps.

In step S501, an emergency communication request from a calling device for a called device is received.

In step S502, a first correlation value between the calling device and the called device is determined.

In step S503, whether the first correlation value is greater than a first preset correlation threshold is determined, and if the first correlation value is greater than the first preset correlation threshold, the calling device is allowed to perform emergency communication with the called device, and step S504 will be performed, otherwise this step ends.

In step S504, communication devices within a set range of the called device are searched.

The set range may be smaller than a coverage range of a base station the called device is currently accessing, and may be a circular area within a first set radius centered at a current location of the called device, or may be a circular area range with a second set radius centered at a predicted location of the called device.

In step S505, communication devices having an emergency communication auxiliary function which is in an on state are selected from the communication devices found in the searching as auxiliary devices.

In step S506, a second correlation value between the auxiliary devices and the called device is determined.

In a specific application, the second correlation value between the auxiliary device and the called device may be determined in various manners as follows.

Method 1, User Settings

The second correlation value between the auxiliary device and the called device is determined according to the auxiliary contact association set by the auxiliary device and the called device, or the auxiliary user setting to help the friend to answer or help the stranger to answer.

Method 2, Base Station Decision

The second correlation value between the auxiliary device and the called device is determined according to information such as the contact frequency of the auxiliary device and the called device, the call duration, and the like.

Method 3, Third Party

For example, the second correlation value between the auxiliary device and the called device is determined by using WeChat moments, QQ friends, and the like.

In each method, the specific second correlation value calculation method can be set by the user or the manufacturer.

In step S507, whether the second correlation value is greater than a second preset correlation threshold is determined, and if the second correlation value is greater than the second preset correlation threshold, the auxiliary devices are allowed to assist the called device to perform emergency communication, and step S508 will be performed, otherwise this step ends.

In step S506 and step S507, whether the auxiliary devices are allowed to assist the called device to perform emergency communication is determined according to the degree of correlation between the auxiliary devices and the called device, so that only an auxiliary device with a high degree of correlation with the called device is allowed to assist the called device to perform emergency communication, and an auxiliary device with a low degree of correlation is not allowed to assist the called device to perform emergency communication. This is because, in a specific application, in most cases, family, friends, and other closely related people will be willing to assist each other in emergency communication, and people with general relationships or strangers do not want to assist each other in emergency communication. If a stranger is selected as an auxiliary device, the auxiliary device user is likely to refuse to assist the called device in emergency communication. If there are many of such auxiliary devices, the establishment time of the emergency communication will be prolonged. Therefore, by step S506 and step S507, the setup time of the emergency communication can be shortened, and the emergency communication can be established quickly and in a timely manner.

In step S508, a communication connection between the calling device and the auxiliary devices is established, so that a user of the calling device communicates with a user of the called device through the auxiliary devices, and this step ends.

In other embodiments of the present disclosure, step S502 and step S503 may also be removed on the basis of the embodiment shown in FIG. 5.

The emergency communication method in the embodiment of the present invention realizes emergency communication between a calling device and a called device by using other communication devices in the vicinity of the called device, does not require the called user to carry any standby device, and can realize emergency communication in real time, which is convenient and quick and ensures the timely establishment of emergency communications. Moreover, the emergency communication method in the embodiment of the present disclosure determines whether the calling device is allowed to perform emergency communication with and the called device according to the degree of correlation between the calling device and the called device, thereby avoiding abuse of the emergency communication function between communication devices with no association or less association to save communication resources. Furthermore, the emergency communication method of the embodiment of the present disclosure determines whether the auxiliary devices are allowed to assist the called device to perform emergency communication according to the degree of correlation between the auxiliary devices and the called device, thereby shortening the establishment time of the emergency communication and ensuring the rapid and timely establishment of emergency communication.

Figure 6:
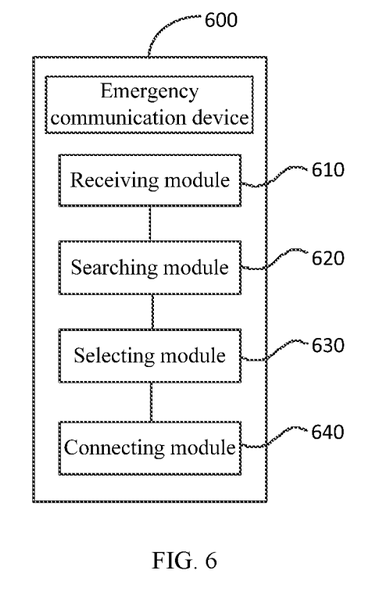
FIG. 6 is a structural block diagram of an emergency communication device according to embodiment 4 of the present disclosure.

FIG. 6 is a structural block diagram of an emergency communication device according to embodiment 4 of the present disclosure. As shown in FIG. 6, in the embodiment, the emergency communication device 600 may include a receiving module 610, a searching module 620, a selecting module 630, and a connecting module 640 connected successively. The receiving module 610 is configured to receive an emergency communication request issued from a calling device for a called device. The searching module 620 is configured to search for communication devices within a set range of the called device. The selecting module 630 is configured to select, from the communication devices found in the searching by the searching module 620, communication devices having an emergency communication auxiliary function which is in an on state as auxiliary devices. The connecting module 640 is configured to establish a communication connection between the calling device and the auxiliary devices, so that a user of the calling device communicates with a user of the called device through the auxiliary devices.

It should be noted that the receiving module 610 may receive the emergency communication request of the calling device only when the emergency communication function of the calling device is in an on state.

The calling device, the called device, and the auxiliary device may be mobile phones.

The set range can be set by the user, the manufacturer or the operator. For example, the set range may be smaller than a coverage range of a base station the called device is currently accessing, and may be a circular area range with a first set radius centered at a current location of the called device, or may be a circular area range with a second set radius centered at a predicted location of the device. The first set radius and the second set radius may be set by the user, the manufacturer, or the operator.

In the embodiment of the present disclosure, the connecting module 640 may include a first connection unit. The first connection unit is configured to attempt to establish a communication connection between the calling device and each of auxiliary devices in a descending order of priorities of the auxiliary devices until a communication connection is successfully established between one of the auxiliary devices and the calling device.

In the embodiment of the present disclosure, the connecting module 640 may include an auxiliary unit. The auxiliary unit is configured to use the auxiliary devices as relay devices, and cause the auxiliary devices to forward a communication signal of the calling device to the called device.

In the embodiment of the present disclosure, the user of the called device can also communicate with the user of the calling device by answering the auxiliary devices.

The emergency communication device of the embodiment of the present invention realizes emergency communication between a calling device and a called device by using other communication devices in the vicinity of the called device, does not require the called user to carry any standby device, and can realize emergency communication in real time, which is convenient and quick and ensures the timely establishment of emergency communications.

Figure 7:
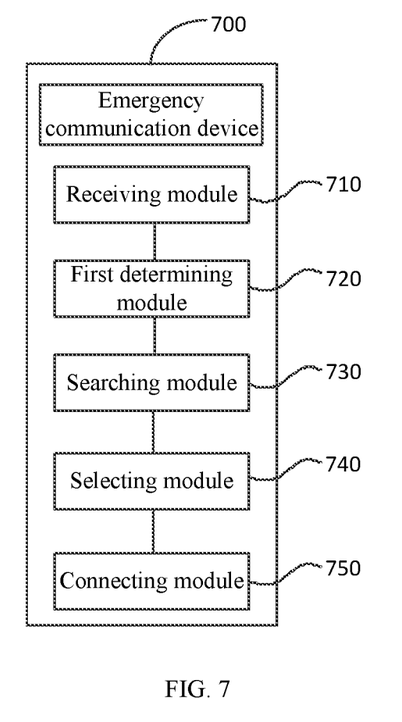
FIG. 7 is a structural block diagram of an emergency communication device according to embodiment 5 of the present disclosure.

FIG. 7 is a structural block diagram of an emergency communication device according to embodiment 5 of the present disclosure. As shown in FIG. 7, in the embodiment, the emergency communication device 700 may include a receiving module 710, a first determining module 720, a searching module 730, a selecting module 740, and a connecting module 750 connected successively. The receiving module 710 is configured to receive an emergency communication request issued from a calling device for a called device. The first determining module 720 is configured to determine a first correlation value between the calling device and the called device, and when the first correlation value is greater than a first preset correlation threshold, to activate the searching module 730 to allow the calling device to perform emergency communication with the called device. The searching module 730 is configured to search for communication devices within a set range of the called device. The selecting module 740 is configured to select, from the communication devices found in the searching by the searching module 730, communication devices having an emergency communication auxiliary function which is in an on state as auxiliary devices. The connecting module 750 is configured to establish a communication connection between the calling device and the auxiliary devices, so that a user of the calling device communicates with a user of the called device through auxiliary devices.

The first determining module 720 can determine the first correlation value between the calling device and the called device according to the method described in the foregoing step S402.

The emergency communication device of the embodiment of the present invention realizes emergency communication between a calling device and a called device by using other communication devices in the vicinity of the called device, does not require the called user to carry any standby device, and can realize emergency communication in real time, which is convenient and quick and ensures the timely establishment of emergency communications. Moreover, the emergency communication device in the embodiment of the present disclosure determines whether the calling device is allowed to perform emergency communication with and the called device according to the degree of correlation between the calling device and the called device, thereby avoiding abuse of the emergency communication function between communication devices with no association or less association to save communication resources.

Figure 8:
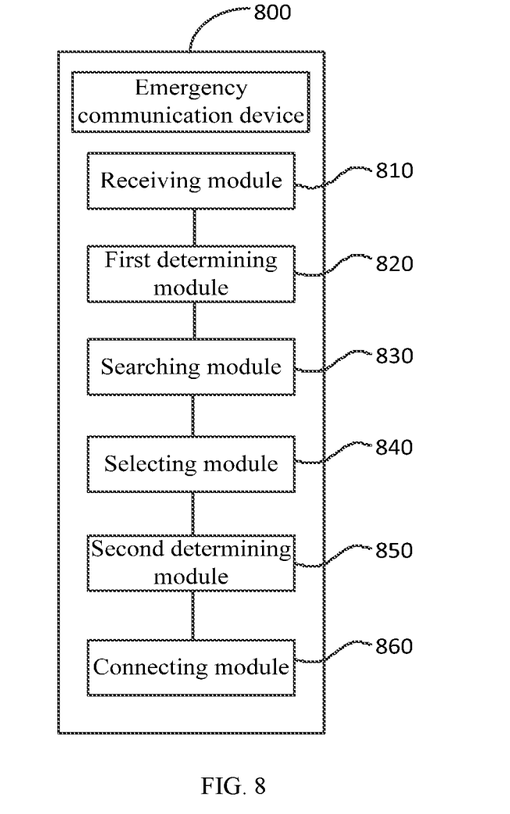
FIG. 8 is a structural block diagram of an emergency communication device according to embodiment 6 of the present disclosure.

FIG. 8 is a structural block diagram of an emergency communication device according to embodiment 6 of the present disclosure. As shown in FIG. 8, in the embodiment, the emergency communication device 800 may include a receiving module 810, a first determining module 820, a searching module 830, a selecting module 840, a second determining module 850, and a connecting module 860. The receiving module 810 is configured to receive an emergency communication request issued by the calling device for the called device. The first determining module 820 is configured to determine a first correlation value between the calling device and the called device, and when the first correlation value is greater than a first preset correlation threshold, to activate the searching module 830 to allow the calling device to perform emergency communication with the called device. The searching module 830 is configured to search for communication devices within a set range of the called device. The selecting module 840 is configured to select, from the communication devices found in the searching by the searching module 830, communication devices having an emergency communication auxiliary function which is in an on state as auxiliary devices. The second determining module 850 is configured to determine a second correlation value between the auxiliary devices and the called device, and when the second correlation value is greater than a second preset correlation threshold, to activate the connecting module 860 to allow the auxiliary devices to assist the called device in emergency communication. The connecting module 860 is configured to establish a communication connection between the calling device and the auxiliary devices, so that a user of the calling device communicates with a user of the called device through the auxiliary device.

The first determining module 820 may determine the first correlation value between the calling device and the called device according to the method described in the foregoing step S402.

The second determining module 850 may determine the second correlation value between the auxiliary device and the called device according to the method described in the foregoing step S506.

In other embodiments of the present disclosure, based on the emergency communication device 800 shown in FIG. 8, the first determining module 820 can be eliminated.

The emergency communication device of the embodiment of the present invention realizes emergency communication between a calling device and a called device by using other communication devices in the vicinity of the called device, does not require the called user to carry any standby device, and can realize emergency communication in real time, which is convenient and quick and ensures the timely establishment of emergency communications. Moreover, the emergency communication device in the embodiment of the present disclosure determines whether the calling device is allowed to perform emergency communication with and the called device according to the degree of correlation between the calling device and the called device, thereby avoiding abuse of the emergency communication function between communication devices with no association or less association to save communication resources. Furthermore, the emergency communication device of the embodiment of the present disclosure determines whether the auxiliary devices are allowed to assist the called device to perform emergency communication according to the degree of correlation between the auxiliary devices and the called device, thereby shortening the establishment time of the emergency communication and ensuring the rapid and timely establishment of emergency communication.

Embodiment 7 of the present disclosure provides a non-transitory computer readable storage medium storing computer instructions. The computer instructions cause a computer to perform the method provided by any one of the foregoing method embodiments.

Embodiment 8 of the present disclosure provides a computer program product including a computer program stored on a non-transitory computer readable storage medium. The computer program includes program instructions. When the program instructions are executed by a computer, the computer is caused to perform the method provided by any of the above method embodiments.

Figure 9:
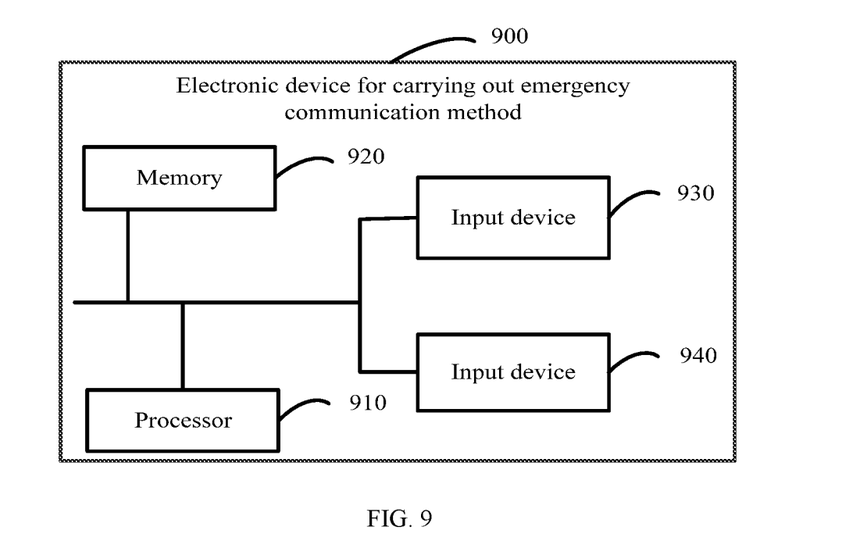
FIG. 9 is a hardware structural diagram of an electronic device for carrying out an emergency communication method according to embodiment 9 of the present disclosure.

FIG. 9 is a schematic diagram showing the hardware structure of an electronic device 900 for carrying out an emergency communication method according to embodiment 9 of the present disclosure. As shown in FIG. 9, the electronic device includes one or more processors 910 and a memory 920. One processor 910 is taken as an example in FIG. 9.

The electronic device can also include an input device 930 and an output device 940.

The processor 910, the memory 920, the input device 930, and the output device 940 may be connected by a bus or other means, as exemplified by a bus connection in FIG. 9.

The memory 920 is used as a non-transitory computer readable storage medium, and can be used for storing non-transitory software programs, non-transitory computer executable programs, and modules, such as program instructions/modules corresponding to the emergency communication method in the embodiments of the present disclosure (for example, the receiving module 610, the searching module 620, the selecting module 630, and the connecting module 640 shown in FIG. 6). The processor 910 executes various functional applications and data processing of the server by running the non-transitory software programs, instructions, and modules stored in the memory 9, that is, implementing the emergency communication method in the above method embodiments.

The memory 920 may include a program storage area and a data storage area. The program storage area may store an operating system and an application required for at least one function. The data storage area may store data created according to the use of the emergency communication device, and the like. Further, the memory 9 may include a high speed random access memory, and may also include non-transitory memory, such as at least one magnetic disk storage device, flash memory device, or other non-transitory solid state storage device. In some embodiments, the memory 920 can optionally include a memory remotely located relative to the processor 910, which can be connected to the emergency communication device over a network. Examples of such networks include, but are not limited to, the Internet, intranets, local area networks, mobile communication networks, and combinations thereof.

The input device 930 may receive input numeric or character information and generate key signal inputs related to user settings and function control of the emergency communication device. The output device 940 can include a display device such as a display screen.

The one or more modules are stored in the memory 920, and when executed by the one or more processors 910, perform an emergency communication method in any of the above method embodiments.

The above products may implement the methods provided by the embodiments of the present disclosure, and have the corresponding functional modules and beneficial effects required for implementing the method. For technical details that are not described in detail in this embodiment, reference may be made to the method provided by the embodiments of the present disclosure.

The electronic device of the embodiment of the present disclosure exists in various forms, including but not limited to:

(1) Mobile communication devices: These devices are featured by mobile communication functions and are mainly aimed at providing voice and data communications. Such terminals include: smart phones (such as iPhone), multimedia phones, functional phones, low-end phones, and the like.

(2) Ultra-mobile PC devices: These devices belong to the category of personal computers, have computing and processing functions, and generally have mobile Internet access. Such terminals include: PDAs, MIDs, UMPC devices, and the like, such as the iPad.

(3) Portable entertainment devices: These devices can display and play multimedia content. Such devices include: audio and video players (such as iPod), handheld game consoles, e-books, and smart toys and portable on-board navigation devices.

(4) Server: A device that provides computing services. The server consists of a processor, a hard disk, a memory, a system bus, etc. The server is similar to a general-purpose computer architecture, but because of the need to provide highly reliable services, the requirements on processing power, stability, high reliability, security, scalability, and manageability are high.

(5) Other electronic devices with data interaction functions.

The device embodiments described above are merely illustrative. The units described as separate components may or may not be physically separated. The components displayed as units may or may not be physical units, i.e., may be located at one place, or may be distributed to multiple network units. Some or all of the modules may be selected according to actual needs to achieve the objects of the solution of the embodiment.

Through the description of the above embodiments, those skilled in the art can clearly understand that the various embodiments can be implemented by means of software plus a necessary general hardware platform, and of course, by hardware. Based on such understanding, the above technical solutions may be embodied in the form of software products in essence or in the form of software products, which may be stored in a computer readable storage medium such as a magnetic disk, an optical disk, a read only memory (ROM) or a random access memory (RAM), etc., including instructions for causing a computer device (which may be a personal computer, server, or network device, etc.) to perform the method described in various embodiments or some embodiments. The above is only the preferred embodiment of the present disclosure, and is not intended to limit the present disclosure. Any modifications, equivalent substitutions, improvements, etc. made within the spirit and principles of the present disclosure are included in the protection of the present disclosure.

What is claimed is:

1. An emergency communication method, comprising:
   receiving an emergency communication request issued from a calling device for a called device;
   searching for communication devices within a set range of the called device;
   selecting, from communication devices found in the searching, a communication device having an emergency communication auxiliary function which is in an on state as an auxiliary device; and
   establishing a communication connection between the calling device and the auxiliary device, so that a user of the calling device communicates with a user of the called device through the auxiliary device;
   wherein the emergency communication method further comprising, prior to searching for communication devices within the set range of the called device:
   determining a first correlation value between the calling device and the called device, and allowing emergency communication between the calling device and the called device when the first correlation value is greater than a first preset correlation threshold,
   wherein the first correlation value is A when the calling device and the called device are each other's emergency contact, the first correlation value is B when one of the calling device and the called device is an emergency contact of the other party, and the first correlation value is C when the calling device and the called device are not the emergency contact of the other party, and A is greater than B, and B is greater than C.

2. The emergency communication method according to claim 1, further comprising, prior to establishing the communication connection between the calling device and the auxiliary device:
   determining a second correlation value between the auxiliary device and the called device, and allowing the auxiliary device to assist the called device in emergency communication when the second correlation value is greater than a second preset correlation threshold.

3. The emergency communication method according to claim 1, wherein the set range is smaller than a coverage range of a base station the called device is currently accessing, and the set range is a circular area range with a first set radius centered at a current location of the called device, or the set range is a circular area range with a second set radius centered at a predicted location of the called device.

4. The emergency communication method according to claim 1, wherein said establishing the communication connection between the calling device and the auxiliary device, so that the user of the calling device communicates with the user of the called device through the auxiliary device comprises:
   attempting to establish a communication connection between the calling device and each of auxiliary devices in a descending order of priorities of the auxiliary devices until a communication connection is successfully established between one of the auxiliary devices and the calling device.

5. An emergency communication device, comprising:
   at least one processor, and
   a memory communicatively coupled to the at least one processor,
   wherein the memory stores instructions executable by the at least one processor, the instructions being configured to:
   receive an emergency communication request issued from a calling device for a called device;
   search for communication devices within a set range of the called device;
   select, from communication devices found in the searching, a communication device having an emergency communication auxiliary function which is in an on state as an auxiliary device; and
   establish a communication connection between the calling device and the auxiliary device, so that a user of the calling device communicates with a user of the called device through the auxiliary device;
   wherein the instructions is configured to, prior to searching for communication devices within the set range of the called device:
   determining a first correlation value between the calling device and the called device, and allowing emergency communication between the calling device and the called device when the first correlation value is greater than a first preset correlation threshold,
   wherein the first correlation value is A when the calling device and the called device are each other's emergency contact, the first correlation value is B when one of the calling device and the called device is an emergency contact of the other party, and the first correlation value is C when the calling device and the called device are not the emergency contact of the other party, and A is greater than B, and B is greater than C.

6. The emergency communication device according to claim 5, the instructions is configured to determine a second correlation value between the auxiliary device and the called device, and when the second correlation value is greater than a second preset correlation threshold, allow the auxiliary devices to assist the called device in emergency communication.

7. The emergency communication device according to claim 5, wherein the set range is smaller than a coverage range of a base station the called device is currently accessing, and the set range is a circular area range with a first set radius centered at a current location of the called device, or the set range is a circular area range with a second set radius centered at a predicted location of the called device.

8. The emergency communication device of claim 5, wherein the instructions is configured to attempt to establish a communication connection between the calling device and auxiliary devices in a descending order of priorities of the auxiliary devices until a communication connection is successfully established between one of the auxiliary devices and the calling device.

* * * * *